United States Patent [19]
Shinada

[11] Patent Number: 5,258,856
[45] Date of Patent: Nov. 2, 1993

[54] SCANNING AND EXPOSING METHOD USING A PLURALITY OF OPTICAL BEAMS AND APPARATUS THEREFOR

[75] Inventor: Hidetoshi Shinada, Kanagawa, Japan

[73] Assignee: Fuji Photo Film Co., Ltd., Kanagawa, Japan

[21] Appl. No.: 775,131

[22] Filed: Oct. 11, 1991

[30] Foreign Application Priority Data

Oct. 12, 1990 [JP] Japan .................. 2-274752
Oct. 12, 1990 [JP] Japan .................. 2-274753
Oct. 12, 1990 [JP] Japan .................. 2-274754

[51] Int. Cl.$^5$ ............................................. H04N 1/40
[52] U.S. Cl. .................................... 358/474; 358/481
[58] Field of Search ................ 358/474, 480–481, 358/488; 346/108, 154

[56] References Cited

U.S. PATENT DOCUMENTS

| | | | |
|---|---|---|---|
| 4,475,115 | 10/1984 | Garbe et al. | 346/108 |
| 4,525,729 | 6/1985 | Agulnek et al. | 345/154 |
| 4,712,118 | 12/1987 | Seto et al. | 358/481 |
| 4,943,871 | 7/1990 | Miyagawa | 358/481 |
| 4,958,236 | 9/1990 | Nagashima et al. | 358/480 |
| 4,959,664 | 9/1990 | Naiki et al. | 358/481 |

FOREIGN PATENT DOCUMENTS

| | | |
|---|---|---|
| 53-9856 | 4/1978 | Japan . |
| 54-5455 | 1/1979 | Japan . |
| 57-41618 | 3/1982 | Japan . |
| 63-5741 | 2/1988 | Japan . |

*Primary Examiner*—Stephen Brinich
*Attorney, Agent, or Firm*—Sughrue, Mion, Zinn, Macpeak & Seas

[57] ABSTRACT

A method and apparatus for scanning and exposing in which m laser beams which are arranged in an array so that part of a adjacent laser beams overlap on the photosensitive surface, are main-scanned in a direction intersecting the line along which the laser beams are arranged, while being sub-scanned in the direction in which they are arrayed, to carry out a two-dimensional exposure. The power of at least one of the mth laser beam for the Nth main scanning and the first laser beam for the (N+1)th main scanning is changed, or the distance between the mth laser beam for the Nth main scanning and the first laser beam for the (N+1)th main scanning is changed, to correct density unevenness at the overlapping portion of the mth and the first laser beams.

19 Claims, 15 Drawing Sheets

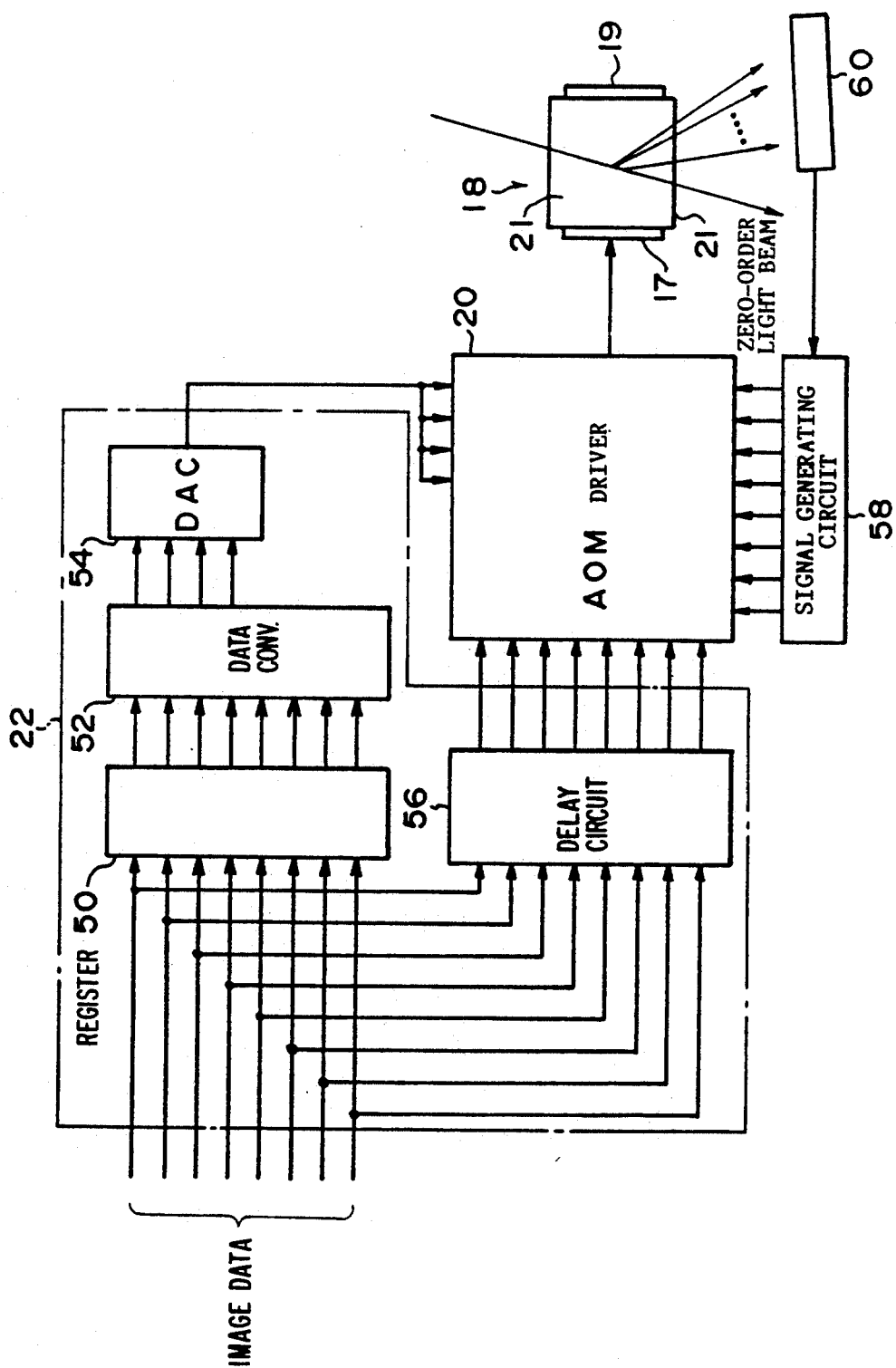

FIG.16A J1 
FIG.16B J2 
FIG.16C L1 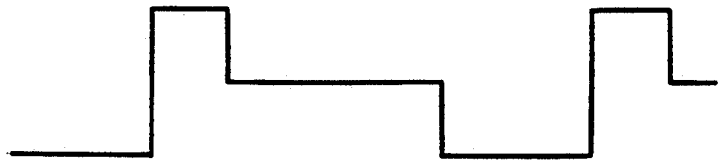
FIG.16D L2 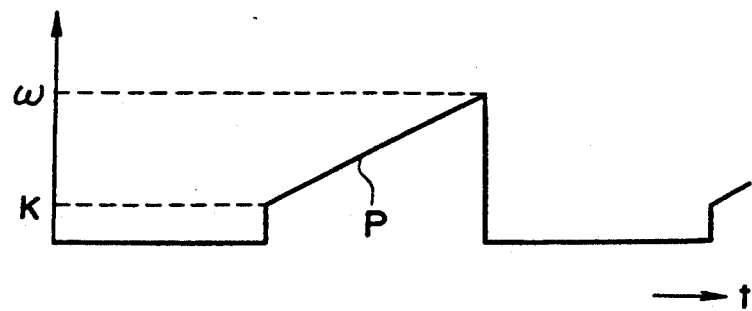
FIG.16E L3 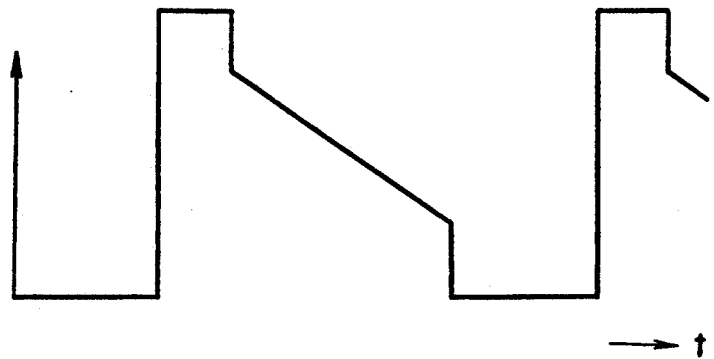

SCANNING AND EXPOSING METHOD USING A PLURALITY OF OPTICAL BEAMS AND APPARATUS THEREFOR

BACKGROUND OF THE INVENTION a) Field of the Invention

The present invention relates to a method of scanning for exposure by a plurality of optical beams and an apparatus therefor, and in particular to the a method and apparatus in which a plurality of optical beams are generated using a multi-frequency acoustic optical element, which divides an incident optical beam into a plurality of portions according to an incident supersonic frequency, for simultaneous scanning for exposure.

b) Description of the Related Art

Conventionally, there has been proposed an apparatus for scanning optical beams, which allows stable and rapid reading or recording of an image, realized by using a plurality of laser beams formed by an optical modulating apparatus providing a multi-frequency acoustic optical element (AOM) (See, for example, Japanese Patent Publication 63-5741, Japanese Patent Laid-Opens 54-5455 and 57-41618, Japanese Patent Laid-Open 53-9856 and the like).

In the optical beam scanning apparatus such as a laser beam recording apparatus or the like, in which an image is recorded using such a multi-frequency acoustic optical element, a plurality of laser beams are arranged in an array so as to partially overlap with each other on a photosensitive surface. Then, the photosensitive surface is illuminated to carry out main scanning and sub-scanning of the laser beams by means of an optical scanning system which comprises a rotating polygon mirror, a galvanometer and the like to achieve scanning in a two-dimensional plane.

That is, the main scannings of the plurality of laser beams are simultaneously carried out by the reflection of the beams from the reflecting surface of the polygon mirror rotating at a rapid speed. In addition, these reflected laser beams are sub-scanned by being reflected by the galvanometer mirror rotated at a predetermined speed. By this sub-scanning procedure, the end portions of the plurality of laser beams are connected without any clearance so that a two-dimensional scanning is achieved to form an image on the two-dimensional plane.

Incidentally, recording materials for recording an image which are used in a laser beam recording apparatus or the like, may be roughly classified into: a silver salt film, the typical examples of which are a silver gelatin film and a thermally developed film (dry silver film), and a non-silver salt film, the typical example of which is a LDF (laser direct recording film) or the like. In an optical beam scanning apparatus such as a laser beam recording apparatus or the like, a silver salt film such as a dry silver film, which is treated using a dry method, is often used.

However, in an optical beam scanning apparatus such as a laser beam recording apparatus or the like using a group of laser beams, if silver salt film is used for the recording material, the density characteristic of the image can fluctuate due to the reciprocity law, and the reciprocity and multiple-exposure of the photosensitive material. That is, the fact that the end portions of the laser beams are each overlapped on the photosensitive material by sub-scanning means and that the end portions of the laser beams are further overlappingly exposed over time on the already exposed portion of the photosensitive material in order to carry out a subsequent recording (multiple exposure). For the silver salt film. It is conventionally known that the image density is increased by this multiple exposure. The reasons why this overlapping portion is increased in density are as follows: in the portion of the photosensitive material exposed by the low power portion (having low luminance) of the laser beam, which is a Gaussian beam, a sub-latent image and an initial image grow prior to the growth of the latent image associated with the prevailing density. If the laser beams are illuminated again after a predetermined time lapse to this sub-latent image and initial image portions on the photosensitive material, then the already exposed portion will correspond to the previously exposed portion and grow into a latent image by the repeated exposure, with the result that this overlapping portion (portion where the plurality of laser beams are connected) is increased in density.

In consequence, this increase in density of the overlapping portion on the photosensitive material causes an unevenness in the image density of the resulting film.

SUMMARY OF THE INVENTION

The present invention was made in order to solve the foregoing problem and its object lies in providing a method of scanning with a plurality of optical beams and an apparatus therefor, in which the effect of unevenness of density which occurs when the photosensitive material is exposed to a plurality of optical beams, is extremely reduced.

In order to achieve the foregoing object, according to the present invention, m optical beams are arranged in a row so that part of adjacent optical beams may overlap with each other on the photosensitive surface, and when the main scanning and sub-scanning are carried out to enable scanning and exposure in the two-dimensional plane (the former is carried out in the direction intersecting with the line along which the optical beams are arranged and the latter is carried out in the arrayed direction of the optical beams), at least one of the m-th one of the optical beams for the N-th main scanning and the first one of the optical beams for the (N+1)-th main scanning is varied (where: N is an integer greater than 1).

In the method of scanning with the plurality of optical beams, m optical beams are arranged in an array so that part of adjacent optical beams overlap with each other on a photosensitive surface, and the main scanning and the sub-scanning are performed in a two-dimensional manner. The former being performed in a direction intersecting with the orientation of the array of optical beams and the latter being performed in the same direction as the array of optical beams. In consequence, it can occur that the exposed m-th one of the m optical beams as the Nth main scanning is performed, and the exposed first one of the m optical beams as the (N+1)-th main scanning is performed, overlap, and a change of the density of image can take place. Therefore, according to the present invention, at least one of the m-th one of the m optical beams as the N-th main scanning is performed, and the first one of the optical beams as the N+1 main scanning is performed, is corrected. In so doing, it is conceivable to employ a method of changing the power of at least one of the first optical beam and the m-th optical beam. That is, in this method, the power of the first one of the m optical beams may be changed, or the power of the m-th one of the m optical beams may be changed, or both powers of the first one of the m optical beams and the m-th optical beam may be changed. Thus an image with the proper density can be formed at the overlapping portion of the optical beams.

When the image density is increased at the portion where the m-th exposed one of the m optical beams for the N-th main scanning and the first exposed one of the m optical beams for the (N+1)th main scanning overlap, the power of at least one of the first optical beam and the m-th optical beam is reduced.

As a result, the density of the portion on the photosensitive material where the optical beam for the N-th main scanning and the optical beam for the (N+1)th main scanning overlap is lowered and an accurate with the image proper density can be formed.

Meanwhile, if the image density is lowered at the portion where the m-th exposed one of the m optical beams for the N-th main scanning and the first exposed one of the optical beams for the N+1 main scanning overlap, then the power of at least one of the first optical beam and the m-th optical beam is increased. As a result, the image density there is increased and an image with the proper density can be formed.

When the power of at least one of the first optical beams and the m-th optical beam is changed, the power of the optical beam may be changed over the entire scanning time-period, or alternatively, the power of the optical beam may be changed over only a period of time during which the first exposed optical beam and the m-th optical beam overlap. That is, if the image is recorded in dots, the power of the optical beam is changed only when some of the dots recorded by the first optical beam and some of the dots recorded by the m-th optical beam overlap.

For the above-described correcting method, the distance between the first optical beam and the m-th optical beam can be changed. By changing this distance, the area where the optical beams overlap is changed and an image which has the proper density can be formed there.

According to this method, when the density of the portion where the m-th exposed optical beam for the N-th main scanning and the first exposed optical beam for the (N+1)th main scanning overlap is increased, the distance between the first optical beam and the m-th optical beam is increased. As a result, the density at the overlapping portion on of the beams the photosensitive material is lowered, and an image which has the proper density can be formed.

Meanwhile, if the density is lowered at the portion where the m-th exposed optical beam for the N-th main scanning and the first exposed optical beam for the (N+1)th main scanning overlap, then the distance between the first optical beam and the m-th optical beam is reduced. As a result, the density at the overlapping portion on the photosensitive material is increased and an image which has the proper density can be formed.

Incidentally, also in this method, as with the above-described method, the distance between the optical beams may be changed with time over the entire scanning period, or alternatively, may be changed over only the period of time in which the first exposed optical beam and the m-th exposed optical beam overlap.

As described above, according to the present invention, when the photosensitive surface is exposed to the plurality of optical beams, the unevenness of density which occurs at the portion where the m-th exposed optical beam for the N-th main scanning and the first exposed optical beam for the (N+1)-th main scanning overlap, can be extremely reduced.

BRIEF DESCRIPTION OF THE DRAWINGS

FIG. 12 is a block diagram illustrating a control circuit according to a third embodiment of the present invention;

FIGS. 16A through 16E are both diagrammatic views illustrating an input/output signal in the circuit for supplying a signal to the galvanometer mirror driver according to the third embodiment.

DETAILED DESCRIPTION OF THE PREFERRED EMBODIMENTS

Now, several embodiments according to the present invention are hereinafter described in greater detail with reference to the accompanying drawings.

Figure 2:
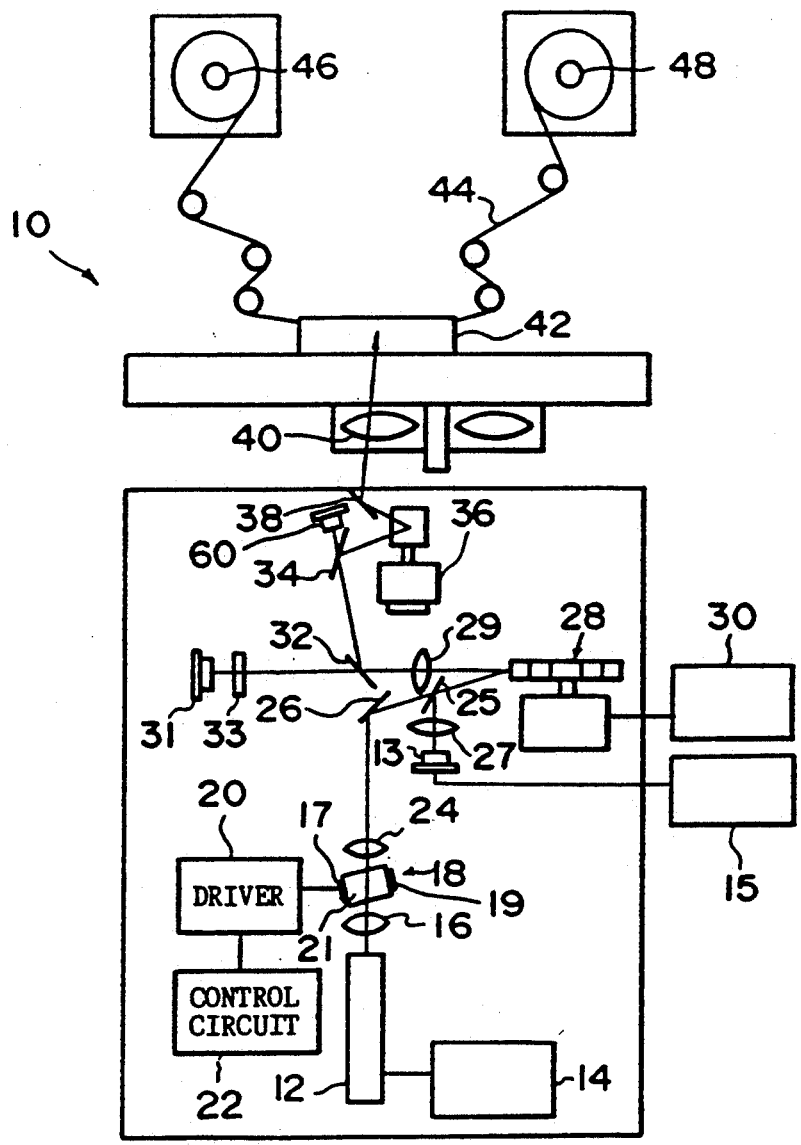
FIG. 2 is a schematic view illustrating a laser beam recording apparatus embodying the present invention.

FIG. 2 illustrates an optical recording apparatus embodying a method of scanning for exposure using a plurality of optical beams according to the present invention. This apparatus is provided with a He-Ne laser 12 connected to a power supply 14. Of course, other gas lasers or semiconductor lasers or the like may be used. At the side of the He-Ne laser 12 where the laser beam is emitted, a lens 16, AOM (acoustic optical element) 18 and a lens 24 are sequentially arranged. AOM 18 is provided with an acoustic optical medium 21 which produces an acoustic optical effect. On two respectively opposite surfaces of the acoustic optical medium 21, a transducer 17 for outputting a supersonic wave corresponding to the input high frequency signal and a sound absorbing material 19 for absorbing the supersonic wave propagating through the acoustic optical medium 21, are adhered. The transducer 17 is connected to an AOM driver 20 for driving AOM 18, and AOM driver 20 in turn is connected to a control circuit 22. In this embodiment, a single incident laser beam is divided into eight laser beams which are emitted from AOM 18. On the side of the lens 24 where the laser beam is emitted, a mirror 26, dichroic mirror 25, polygon mirror (rotating polygon mirror) 28, scanning lens 29, and a dichroic mirror 32 are sequentially arranged. On the side of the dichroic mirror 25 where the laser beam is incident, a semiconductor laser 13 is disposed so that a reference laser beam may become incident via a lens 27. Connected to the semiconductor laser 13 is a semiconductor laser driver 15. The polygon mirror 28 is connected, a polygon mirror driver 30 for rapidly rotating the polygon mirror 28. In addition, a linear encoder 33 and a photoelectric converter 31 comprised of a photodiode or the like are sequentially arranged at a position where the reference laser beam, which passes through the dichroic mirror 32, can be received. The reference laser beam, reflected off of the polygon mirror 28, passes through a dichroic mirror 32 to be scanned on the linear encoder 33. The linear encoder 33 is formed with a planar plate in which multiple transparent portions and opaque portions are alternately disposed in the form of stripes with a constant pitch when linear encoder 33 is scanned by the reference laser beam reflected against the polygon mirror 28, the reference laser beam passes through the transparent portion, and a video clock signal, which is a pulse signal, is emitted from the photoelectric converter 31. The pulse signal from this photoelectric converter 31 enters a galvanometer mirror driver (not shown) for controlling the angle of the galvanometer mirror 36. On the opposite side of the dichroic mirror 32, a sampling mirror 34, galvanometer mirror 36 and a mirror 38 are sequentially arrayed. A photoelectric converter 60 is disposed at a position where the laser beam, which passes through this sampling mirror 34, can be received. This sampling mirror 34 has a low transmission factor and therefore transmits only the laser power needed at the photoelectric converter 60. Therefore, the reduction of the laser power of the He-Ne laser 12 reflected against the sampling mirror 34 can be made smaller. The laser beam reflected against the mirror 38 illuminates stage 42 through a lens 40. At stage 42, a recording material 44 such as a microfilm or the like composed of silver salt film is disposed. This recording material 44 is wound in layers about reels 46 and 48.

Figure 1:
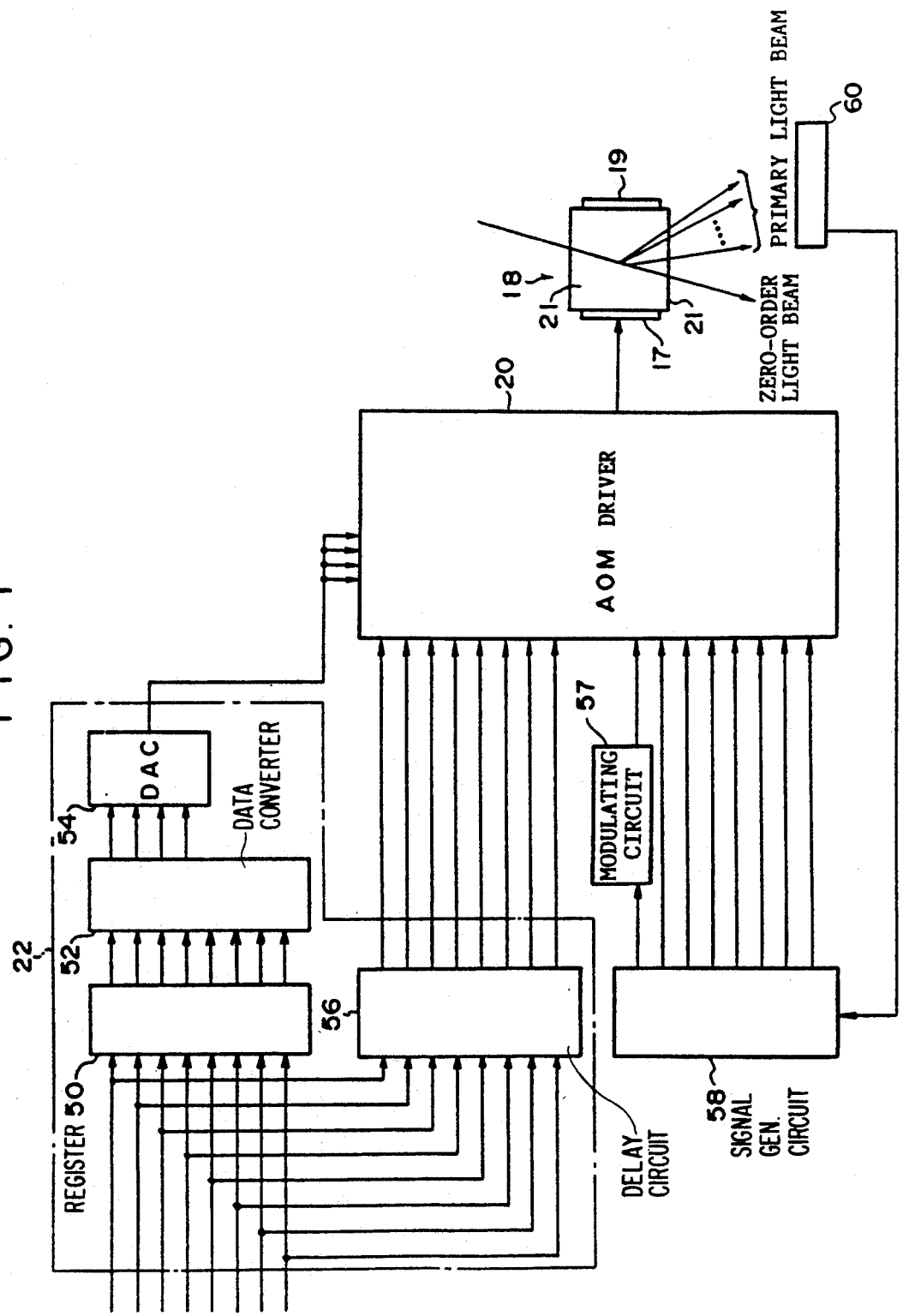
FIG. 1 is a block diagram illustrating the detail of a control circuit according to a first embodiment of the present invention.
Figure 3:
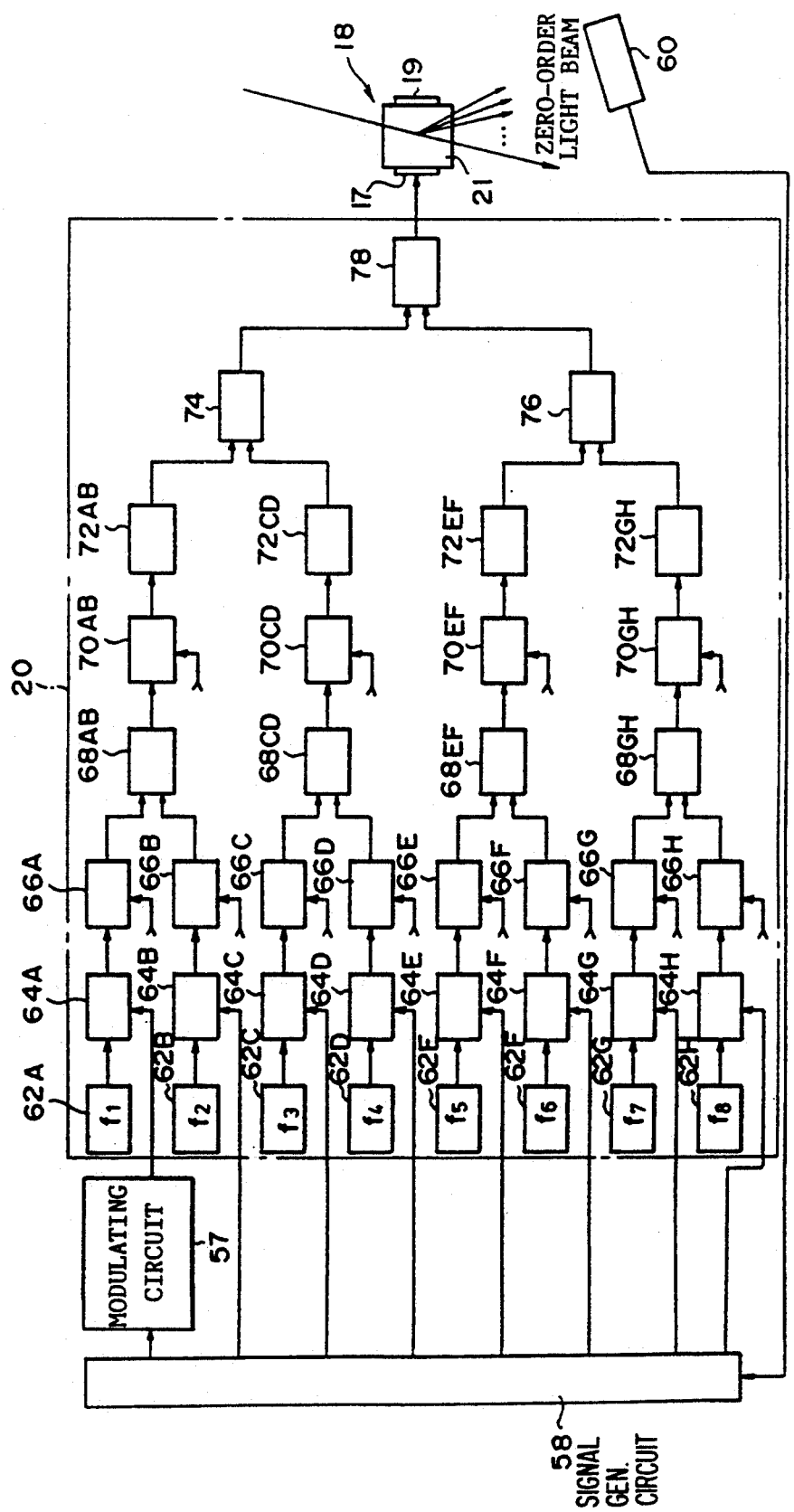
FIG. 3 is a block diagram illustrating an AOM driver according to the first embodiment of the present invention.

As shown in FIG. 1, the photoelectric converter 60, which is disposed at the above-described position of the AOM 18 where the laser beam is emitted for outputting a voltage of a magnitude corresponding to the power of the received laser beam, is connected to a signal generator circuit 58 for emitting a signal for controlling the amplitudes of signals emitted from an oscillating circuit (FIG. 3). A local level control signal corresponding to a first laser beam, which is generated from the signal generator circuit 58, enters into an AOM driver 20 via a modulating circuit 57 while local level control signals corresponding to each of the second through eighth laser beams enter directly into the AOM driver 20.

Figure 5:
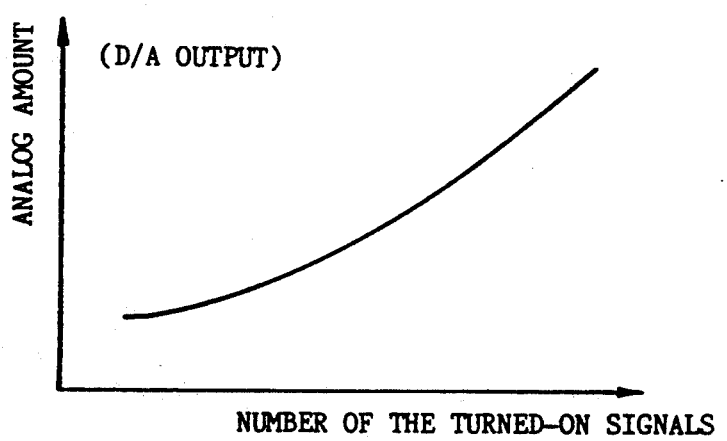
FIG. 5 is a diagrammatic view revealing a relationship between the number of the turned-on image data and the level of the analog signal output from a DAC.

The control circuit 22 is provided with a register 50 for temporarily storing the image data and a data converter 52 connected thereto. This image data is given in the form of eight-bit parallel signal, and when the image is recorded in terms of dots, the image data is turned ON (H level) and when not, it is turned OFF (L level). The data converter 52 emits a four-bit parallel signal corresponding to the number of turned on eight-bit signals entered from the register 50. A DAC (digital-analog converter) 54 is connected to the data converter 52. DAC 54 converts the four-bit parallel signal emitted from the data converter 52 into an analog signal for emitting to the AOM driver 20. As shown in FIG. 5, the level of this analog signal becomes higher as the number of the turned-on signals (that is, the number of the illuminated laser beams) becomes larger. In addition, after the image data is delayed at a delay circuit 56 for a predetermined period of time, it is entered into the AOM driver 20.

As shown in FIG. 3, The output terminal of the modulating circuit 57, which is connected to the signal generating circuit 58 to alter the level of the local level signal for controlling the power of the first one of the eight laser beams, is connected to the level control terminal of a local level control circuit 64A of the AOM driver 20. Among the local level control signals output from the signal generating circuit 58, local level control signals for controlling the power of the second through eighth laser beams are respectively and directly connected to each of the level control terminals of the local level control circuits 64A through 54H of the AOM driver 20. This modulating circuit 57 can be formed by using an arithmetic operational circuit or an amplifier circuit whose gain is less than 1.

AOM driver 20, as shown in FIG. 3, is provided with oscillating circuits 62A, 62B, 62C, 62D, 62E, 62F, 62G, 62H having frequencies fi through f8 respectively, local level control circuits 64A, 64B, 64C, 64D, 64E, 64F, 64G, 64H, and switching circuits 66A, 66B, 66C, 66D, 66E, 66F, 66G and 66H. The local level control circuits 64A through 64H are respectively connected to the output terminals of the oscillating circuits 62A through 62H, and the switching circuits 66A through 66H are respectively connected to the output terminals of each of the local level control circuits 64A through 64H. As the local level control circuit, a double balance mixer or a pin diode attenuator may be used. In addition, the signal generating circuit 58 is connected to the level control terminal of the local level control circuit 64A via the modulating circuit 57, and the signal generating circuit 58 is directly connected to each of the level control terminals of the local level control circuits 64B through 64H. Each piece of image data emitted from the delay circuit 56 enters the control terminals of each of the switching circuits 66A through 66H.

The output terminals of the switching circuits 66A and 66B are connected to the input terminals of a combiner 68AB, which mixes the two signals from circuits 66A and 66B at a ratio of 1:1. Similarly, the output terminals of the switching circuits 66C and 66D are connected to the input terminals of a combiner 68C, the output terminals of the switching circuits 66E, 66F are connected to the input terminal of a combiner 68EF and the output terminals of the switching circuits 66G and 66H are connected to the input terminal of a combiner 68GH.

The output terminal of the combiner 68AB is connected to an amplifier circuit 72AB via a total level control circuit 70AB. Similarly, the output terminal of the combiner 68CD is connected to an amplifier circuit 72CD via a total level control circuit 70CD, the output terminal of the combiner 68EF is connected to an amplifier circuit 72EF via a total level control circuit 70E, and the output terminal of the combiner 68GH is connected to an amplifier circuit 72GH via a total level control circuit 70GH. The output terminals of the amplifier circuits 72AB and 72CD are connected to the input terminal of a combiner 74 and the output terminals of the amplifier circuits 72EF and 72GH are connected to the input terminal of a combiner 76. The output terminals of the combiners 74 and 76 are connected to a combiner 78, the output terminal of which is connected to a transducer 17. The total level control circuit, as well as the local level control circuit, is comprised of a double balanced mixer or a pin diode attenuator, and the output terminal of a DAC 54 of the control circuit 22 is connected to each level control terminal.

The operation of this embodiment is hereinafter described. 8-bit image data supplied from a host computer or the like is supplied to a register 50 and the delay circuit 56. A data converter 52 emits digital signals corresponding to the number of turned-on signals input from the register 50, and DAC 54 emits analog signals, as shown in FIG. 5, which correspond to those digital signals. These analog signals are respectively input into the control terminals of the total level control circuits 70AB through 70GH. In addition, the pieces of image data, delayed by a predetermined period of time by the delay circuit 56, are respectively input into each of the switching circuits 66A through 66H of the AOM driver 20.

The signal output from the oscillating circuits 62A through 62H is supplied to the transducer 17 of the AOM 18 via the switching circuits 66A through 66H, combiners 68AB through 68GH, total level control circuits 70AB through 68GH, total level control circuits 70AB through 70GH, amplifier circuits 72AB through 72GH, combiners 74 and 76 and the combiner 78, after its amplitude is modulated. The transducer 17 converts the input signal into a supersonic signal having a corresponding frequency and amplitude. This supersonic signal propagates through an acoustic optical medium 21 to be absorbed by a sound absorbing material 19. At this time, if the laser beam is being oscillated from the Ne-Ne laser 12, then this laser beam is divided in a direction corresponding to the frequency of the supersonic signal with a power corresponding to the amplitude of the supersonic signal, by the acoustic optical medium 21. Multiple laser beams divided by the AOM 18 are scanned in the main scanning direction by the polygon mirror 28 and are scanned in the sub-scanning direction by the galvanometer mirror 36.

If the main scanning is initiated, a local level control signal corresponding to a first laser beam is input from the signal generator 58. The modulating circuit 57 lowers the level of the local level control signal for input into the local level control circuit 64A. In consequence, the amplitude of the signal output from the oscillating circuit 62A is lowered more than that of the signal output from the oscillating circuits 62A through 62H, so that the power of the first laser beam is lowered relative to that of the other laser beams. As described above, since the power of the first laser beam for the $(N+1)$-th main scanning is lowered relative to that of the m-th laser beam for the N-th main scanning, even if the exposure by the N-th main scanning and the exposure for the $(N+1)$-th main scanning overlap, unevenness of density at the overlapping portion can be effectively prevented.

Figure 7:
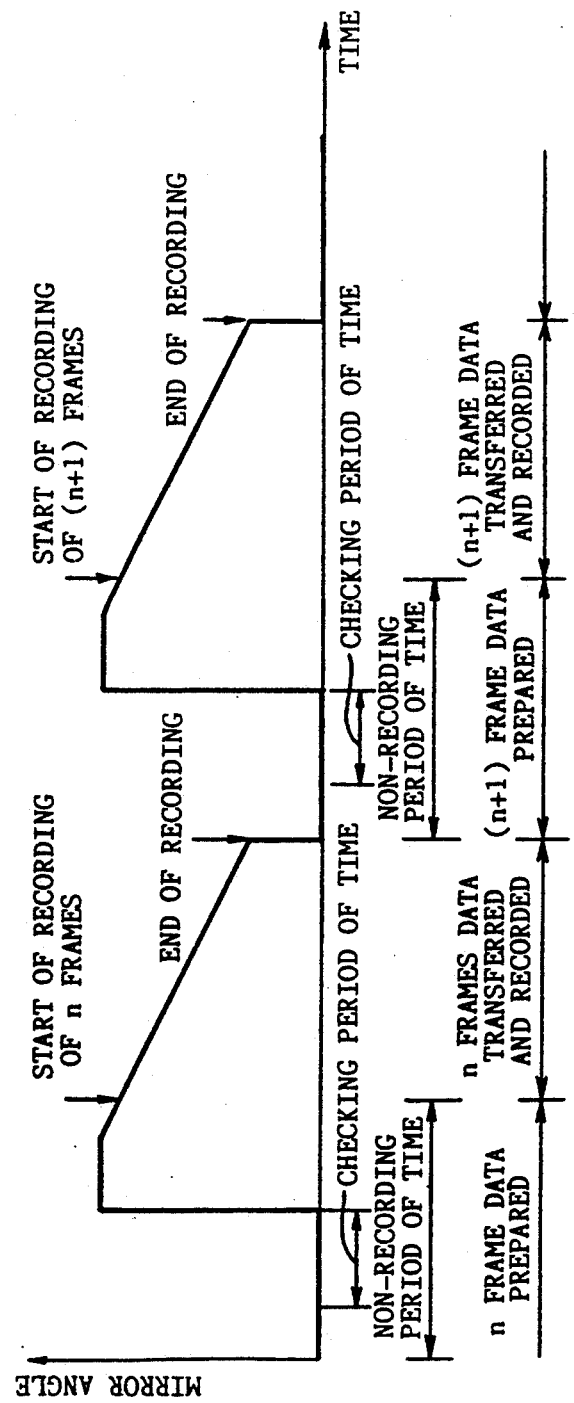
FIG. 7 is a diagrammatic view revealing a relationship between the checking period of time, non-checking period of time and the recording period of time corresponding to the angle of the galvanometer mirror.

FIG. 7 illustrates the varying angle of the galvanometer mirror 36 with respect time. In the non-recording period of time prior to the start of recording of the n-th frame, the image data of the n-th frame is prepared while the recording material is fed by a single frame for positioning. When the recording is initiated, the n-th frame data is transferred until the angle of the galvanometer mirror 36 reaches an angle at which the recording is ended and the n-th image is recorded. In the checking period of the non-recording period, adjustment of the amplitude of the signal output from each of the oscillating circuits 62A through 62H, that is, adjustment of the level, is conducted. At this time, the laser beam output from the AOM, which has passed through a sampling mirror 34, is entered into the photoelectric converter 60. In this level adjustment, a certain voltage is applied to the level control terminals of the total level control circuits 70AB through 70GH and a level adjustment is conducted for each of the oscillating circuits 62A through 62H. That is, with the signal output from the oscillating circuits 62A through 62H, only the switching circuit 66A is turned ON. The signal output from the oscillating circuit 62A is supplied to the transducer 17 via the local level control circuit 64A, switching circuit 66A, combiner 68AB, total level control circuit 70AB, amplifier 72AB and the like. As a result, a laser beam having a power corresponding to the amplitude of the signal output from the local level control circuit 64A is output from the AOM 18. The laser beam emitted from the AOM 18 is received by the photoelectric converter 60 and an electric signal corresponding to the power of the laser beam received from the photoelectric converter 60 is output. The signal generating circuit 58 compares a preset reference value with the level of the signal input from the photoelectric converter 60. This reference value is set for each laser beam. Incidentally, a reference value corresponding to the first laser beam is made smaller than those respectively corresponding to the second to eighth laser beam. If the level of the input signal is greater than the reference value, then the signal generating circuit 58 lowers the voltage applied to the control terminal of the local level control circuit 64A so that the amplitude of the signal becomes smaller and, if the level of the input signal is smaller than the reference value, then it elevates the voltage applied to the control terminal of the local level control circuit 64A so that the signal amplitude becomes greater. As a result, the power of a single laser beam emitted from the AOM is adjusted to a target value. The switching circuits 66B through 66H are sequentially turned ON and, as in the foregoing, the level adjustment is conducted for the oscillating circuits 62B through 62H. In this checking time-period, level adjustment is conducted for all the oscillating circuits 62A through 62H. During recording of the image, the signal generating circuit 58 is maintained at the voltage value adjusted as above.

Figure 4:
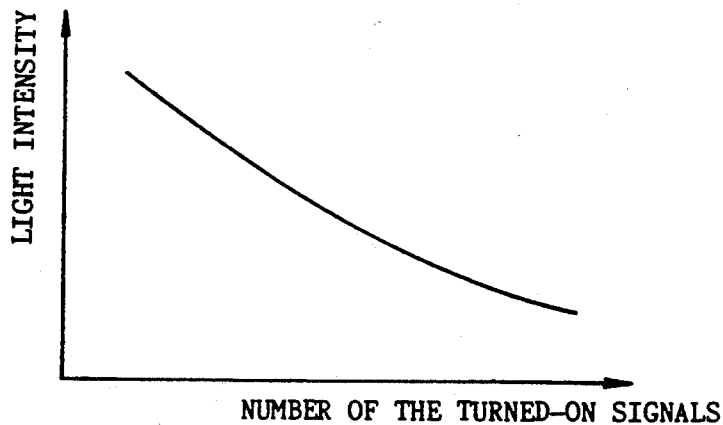
FIG. 4 is a diagrammatic view revealing a relationship between the number of turned-on image data and the power of the laser beam.
Figure 6:
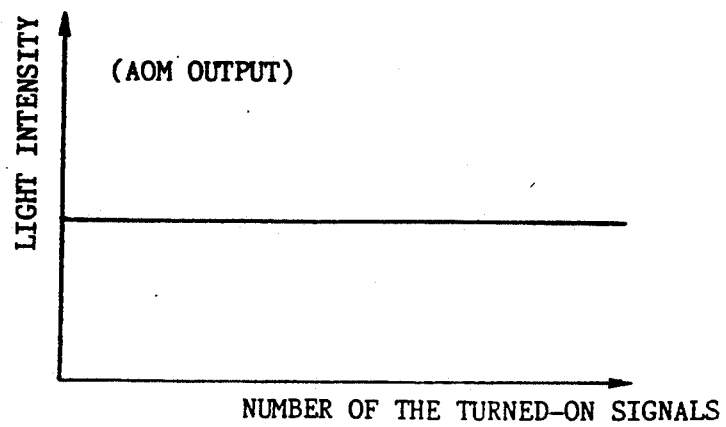
FIG. 6 is a diagrammatic view revealing a relationship between the number of the turned-on image data and the power of the laser beam.

In addition, when the n-th frame data is recorded, an analog signal proportional to the number of the turned-on image data as shown in FIG. 5 is supplied to each of the total level control circuits 70AB, 70CD, 70EF and 70GH by the register 50, data converter 52 and the DAC 54, and the total level control circuit controls the amplitude of the signal output from the combiners 68AB through 68GH according to this analog signal. As a result, the power of each of the laser beams emitted from the AOM 18, as shown in FIG. 6, becomes constant, regardless of the number of the turned-on signals, so that unevenness of density of the image caused by the number of the turned-on image data is prevented. Incidentally, unless the amplitude is controlled according to the number of the turned-on signals, the power of a single laser beam emitted from the AOM is changed according to the number of the simultaneously emitted laser beams, that is, the number of the turned-on image data, as shown in FIG. 4.

In this case, if, after a predetermined period of time passes, laser beams of the same power illuminated a portion of the photosensitive material exposed to the power portion (having low luminance) of the laser beam, (i.e, the Gaussian beam), then the already exposed portion, that is, the connected portion of the plurality of laser beams, becomes denser.

Therefore, in this embodiment, as described in the foregoing, the local level control signal corresponding to the first laser beam for the (N+1)-th main scanning is modulated by the modulating circuit 57.

As a result, the power of the first laser beam for the (N+1)-th main scanning is reduced, and an image which undergoes less change of density can be formed at the overlapping portion where the eighth exposed laser beam for the N-th main scanning and the first laser beam for the N+1-th main scanning overlap.

Incidentally, in the foregoing, although the power of the first one of the eight laser beams for the (N+1)-th main scanning is changed, alternatively, the power of the eighth laser beam for the N-th main scanning may be changed, or the power of both of the laser beams may be changed.

In addition, although the level of the local level control signal is changed by the modulating circuit, alternatively, the modulating circuit may be omitted and the level of the local level control signal may be changed by the signal generating circuit.

Figure 10:
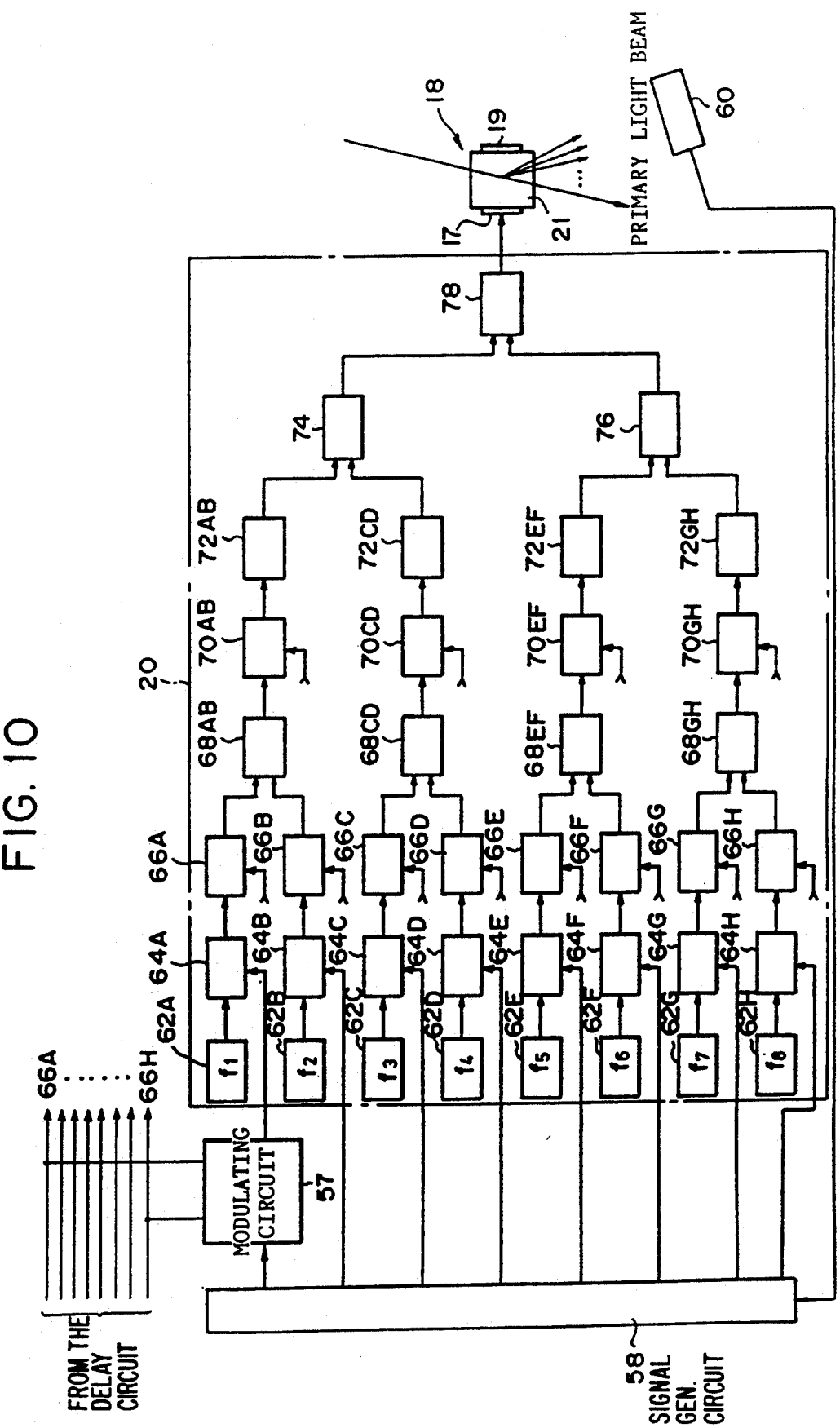
FIG. 10 is a block diagram illustrating an AOM driver according to the second embodiment of the present invention.

Next, a second embodiment of the present invention is hereinafter described. In this embodiment, in place of the modulating circuit 57 of the first embodiment, a modulating circuit 157 is used so that only during the period of time when the first exposed laser beam and the m-th exposed laser beam overlap is the power of at least one of the first laser beam and the m-th laser beam changed relative to that of the other laser beams. Therefore, in FIGS. 8 and 10, the same portions as in FIGS. 1 and 3 are identified with the same reference numerals and their descriptions are omitted and, in the second embodiment, those figures which are the same as in the first embodiment are omitted.

Figure 8:
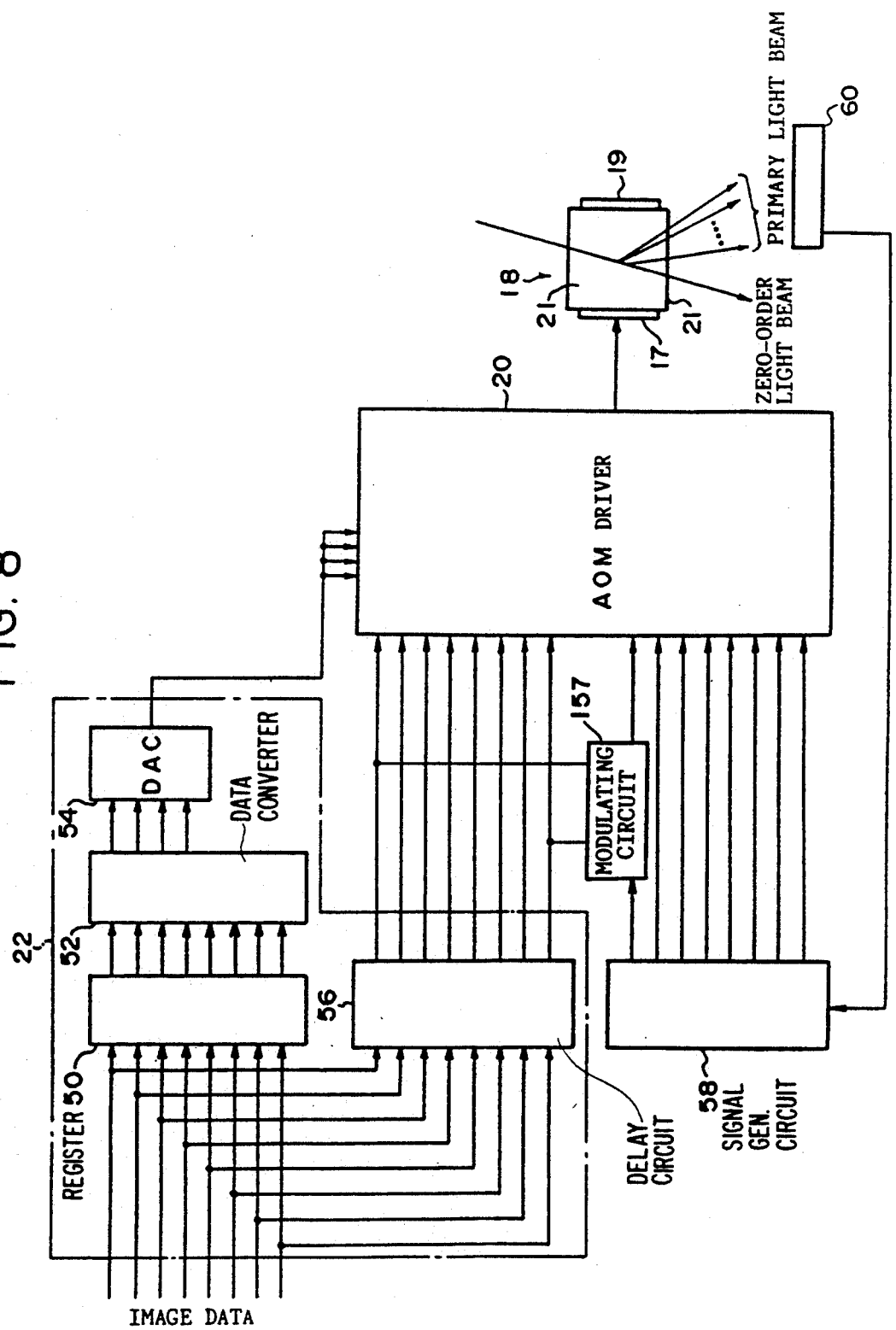
FIG. 8 is a block diagram revealing the detail of a control circuit according to a second embodiment of the present invention.

The modulating circuit 157, as shown in FIG. 8, is connected to the delay circuit 56 and the signal generating circuit 58 so that the image data recorded by the first laser beam emitted from the delay circuit 56 and the image data recorded by the eighth laser beam are input thereinto while the local level control signal output from the signal generating circuit 58 is being input thereinto.

Figure 9:
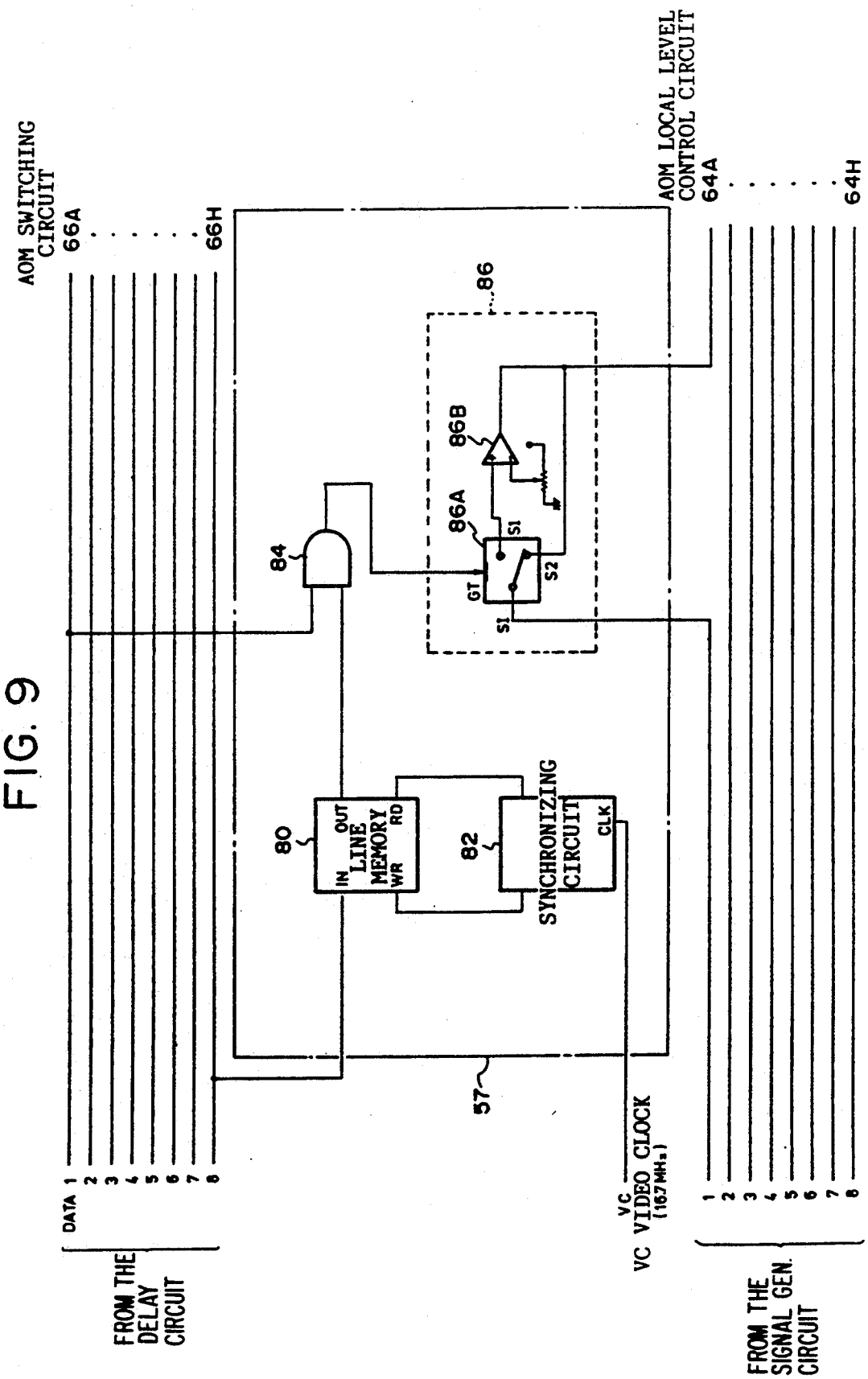
FIG. 9 is a circuit diagram illustrating the detail of a modulating circuit according to the second embodiment of the present invention.

The modulating circuit 157, as shown in FIG. 9, is provided with a switching circuit 86 having an analog switch 86A and a gain adjusting circuit 86B, line memory 80, synchronizing circuit 82 and an AND circuit 84. Among eight pieces of image data output from the delay circuit 56, the first one is input into one input terminal of the AND circuit 84 and the eighth image data is input into the input terminal of the line memory 80. The synchronizing circuit 82 is connected to one input terminal of the AND circuit 84 and the eighth image data is input into the input terminal of the line memory 80. The synchronizing circuit 82 is connected to the write control terminal WR and read control terminal RD of the line memory 80 while a video clock VC (16.7 MHz) is input into the synchronizing circuit 82. The output terminal of the line memory 80 is connected to the other input terminal of the AND circuit 84. The output terminal of the AND circuit 84 is connected to the control terminal GT of an analog switch 86A and a local level control signal corresponding to the first one of the eight pieces of image data input from the signal generating circuit 58 into the input terminal SI of the analog switch 86A. When a low level output is input from the AND circuit 84 into the control terminal GT of the analog switch 86A, the analog switch 86A connects the input terminal S1 and the output terminal S2 while, when a high level output is entered into the control terminal ST, the analog switch 86A connects the input terminal S1 and the output terminal S1. One output terminal S1 of the analog switching circuit 86A is connected to the input terminal of a gain adjusting circuit 86B, the amplifying gain of which is less than 1, and the other output terminal S2 is connected to the output terminal of the gain adjusting circuit 86B. The output terminal of the gain adjusting circuit 86B is entered into an AOM driver 20 as the local level control signal corresponding to the first image data generated from the signal generating circuit 58. The local level control signals corresponding to the second to eighth image data respectively are directly input into the AOM driver 20. As the line memory 80, a FIFO (first-in, first-out) or shift register may be used. In addition, for the switching circuit 86, an operational circuit or an amplifier circuit may be used in place of the analog switch.

Next, the operation of this embodiment is described. As described with reference to the first embodiment, eight laser beams are emitted from the AOM, based on the eight-bit image data supplied from a host computer or the like to perform two-dimensional scanning and exposure. The synchronizing circuit 82 controls the read control terminal RD according to the video clock signal output from the photoelectric converter 31 to output the already stored data from the output terminal OUT while controlling the control terminal WR to store the data input from the output terminal OUT into an area where the data output from the output terminal OUT had been stored. Since a location for storing the image as dots is at a high level and a location where the image is not stored is at a low level, the line memory contents indicate whether the image data of the eighth line, that is, the dots to be stored is present or not.

When the (N+1)-th main scannings are performed, the eight image data for the (N+1)-th main scanning is stored in the main memory 80 according to the video clock signal, the eight image data for the n-th main scanning, which is already stored, is output to the AND circuit according to the video clock signal. A logical AND of the first image data for the N+1-th main scanning and the eighth image data for the N-th main scanning, which is stored within the line memory, is calculated (where: N is an integer of above 1). If both of them are present, since the signals entered to the AND circuit 84 are on a high level, the output signal becomes high and, if at least one of them is not present, at least one of the input signals becomes low, so that the output signal from the AND circuit 84 becomes low. A local level control signal corresponding to the first image data for the (N+1)th main scanning is input into the switching circuit 86. When the output of the AND circuit 86A is on a high level, the output terminal of the analog switch 86A corresponds to the S1 side, and the local level control signal is entered into the gain amplifier circuit 86B. As a result, the level of the local level control signal corresponding to this first image data becomes lower. If the output signal from the analog circuit 84 is on the low level, the output terminal of the analog switching circuit 86A corresponds to the S2 side and the input local level control signal is output as it is.

If the output from the AND circuit 84 is at a high level, since the local level control signal corresponding to the first image data is input into the gain adjusting circuit 86B, the amplifying gain of which is less than 1, by the analog switch 86A, the local level control signal corresponding to the first image data, which is input into the AOM driver 20, becomes lower than that output from the signal generating circuit 58. As described above, the local level control signal corresponding to the first laser beam for the (N+1)th main scanning, which is transmitted from the signal generating circuit 58, is modulated depending on whether the image data recorded by the eighth laser beam for the N-th main scanning is present or not. Next, the power of the laser beam on the photosensitive material is described.

Figure 11A:
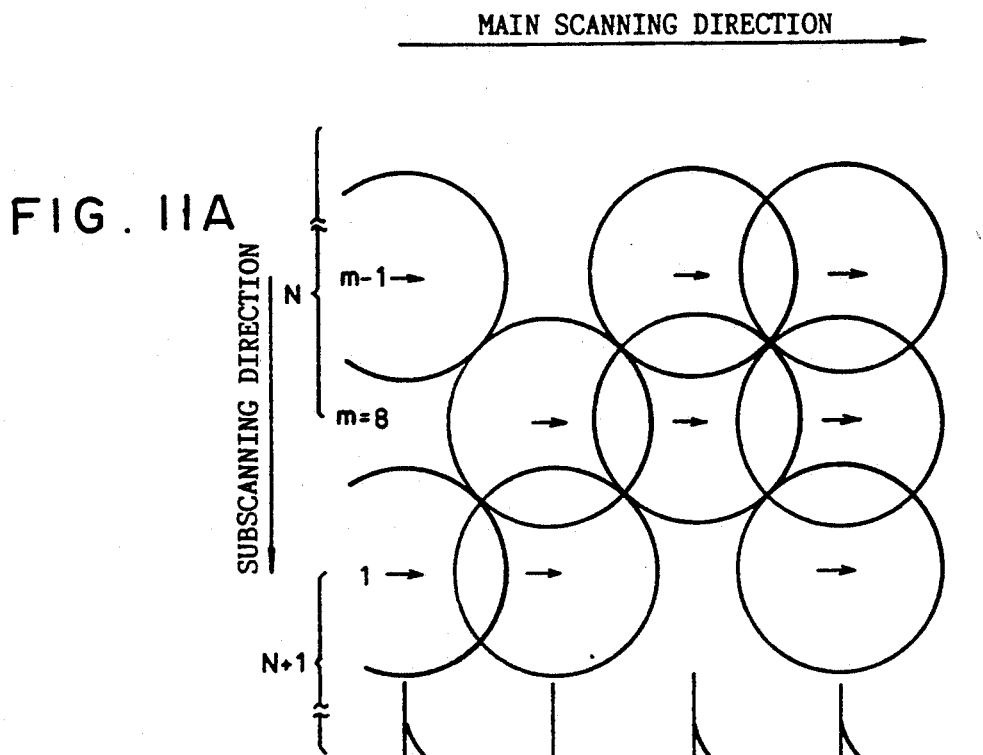
FIGS. 11A and 11B are both diagrammatic views illustrating the illuminating state of the plurality of laser beams on the photosensitive surface, and their powers.
Figure 11B:
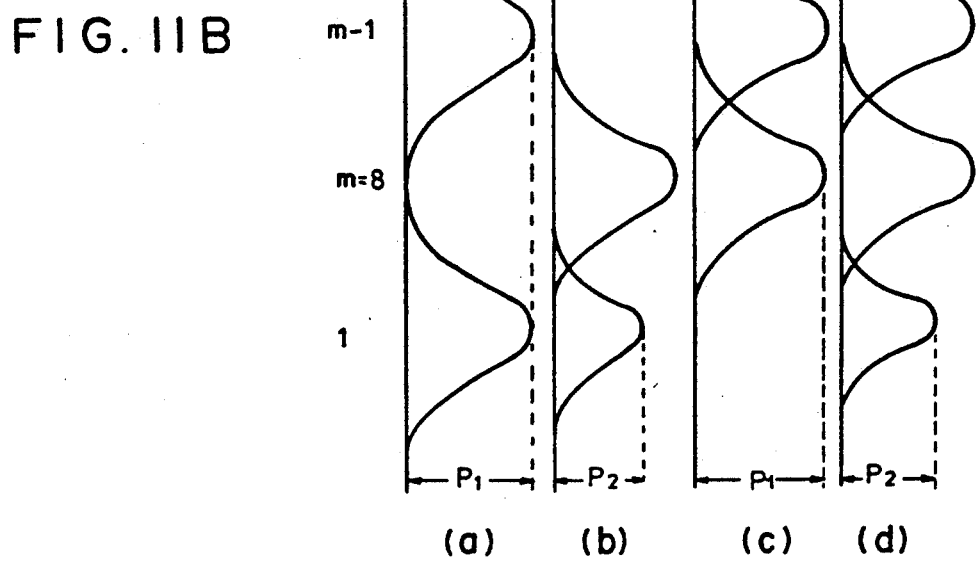

In FIG. 11, (1), whether the laser beam is recorded on the photosensitive material or not is represented for the portion where the Nth and (N+1)th scannings overlap, and FIG. 11B, illustrates the power of each laser beam. As illustrated in (c), the seventh and eighth recording powers on the photosensitive material for the N-th time are P1 while, as indicated in (b) and (d), if the eighth main scanning for the N-th main scanning is recorded and the first image data for the (N+1)th main scanning is recorded, then the power for the first laser beam is set in advance to P2, which is lower than P1. Meanwhile, as indicated in (a), if the eighth main scanning is not recorded and the first recording for the (N+1) main scanning is present, then the power is held at P1.

As a result, with reference to the N-th and (N+1)th main scannings, if the eighth one of the eight laser beams for the N-th main scanning and the first one of the eight laser beams for the (N+1)th main scanning overlap, the power of the first one of the eight laser beams for the (N+1) main scanning is made smaller. As described above, when the eight laser beams are mainly scanned for the N-th and (N+1)th times, since the power of the first laser beam for the (N+1)th main scanning is made smaller depending on whether the eighth laser beam for the Nth main scanning is exposed or not, an image which has the proper density can be formed at the overlapping portion of the laser beams.

Incidentally, although, in the foregoing, the power of the laser beam is changed depending on whether the eighth one of the eight image data for the (N+1)th main scanning is recorded or not, alternatively, the presence or absence of the eighth image data of the eight laser beams for the Nth main scanning and the presence or absence of the image data for the first of the eight laser beams for the (N+1)th main scanning may be stored in advance to change the power of the first laser beam for the (N+1) main scanning, or the powers of both of the laser beams may be changed. Meanwhile, although, in the foregoing, the power of the first of the eight laser beams for the (N+1)th main scanning is changed, the presence or absence of the image data of the eighth of the eight laser beams for the Nth main scanning and the presence or absence of the image data for the first of the eight laser beams for the (N+1)th main scanning may be stored in advance to change the power of the eighth laser beam for the Nth main scanning, or both laser beams may be changed.

As described above, according to this embodiment, unevenness of density which is caused at the overlapping portion of the laser beams by the reciprocity law, reciprocity and multiple exposures, can be reduced.

If, in this embodiment, a level adjustment as in the first embodiment is conducted, then it is stored within the line memory during the non-recording period of time that the image data is not present. Accordingly, the above-described level adjustment can be effected without the local level control circuit being modulated in the modulating circuit 157.

Next, a third embodiment of this invention is described. This embodiment is intended to eliminate density unevenness by altering the gap between the eighth laser beam for the Nth main scanning and the first laser beam for the (N+1)th main scanning relative to the gap between the other laser beams.

Figure 13:
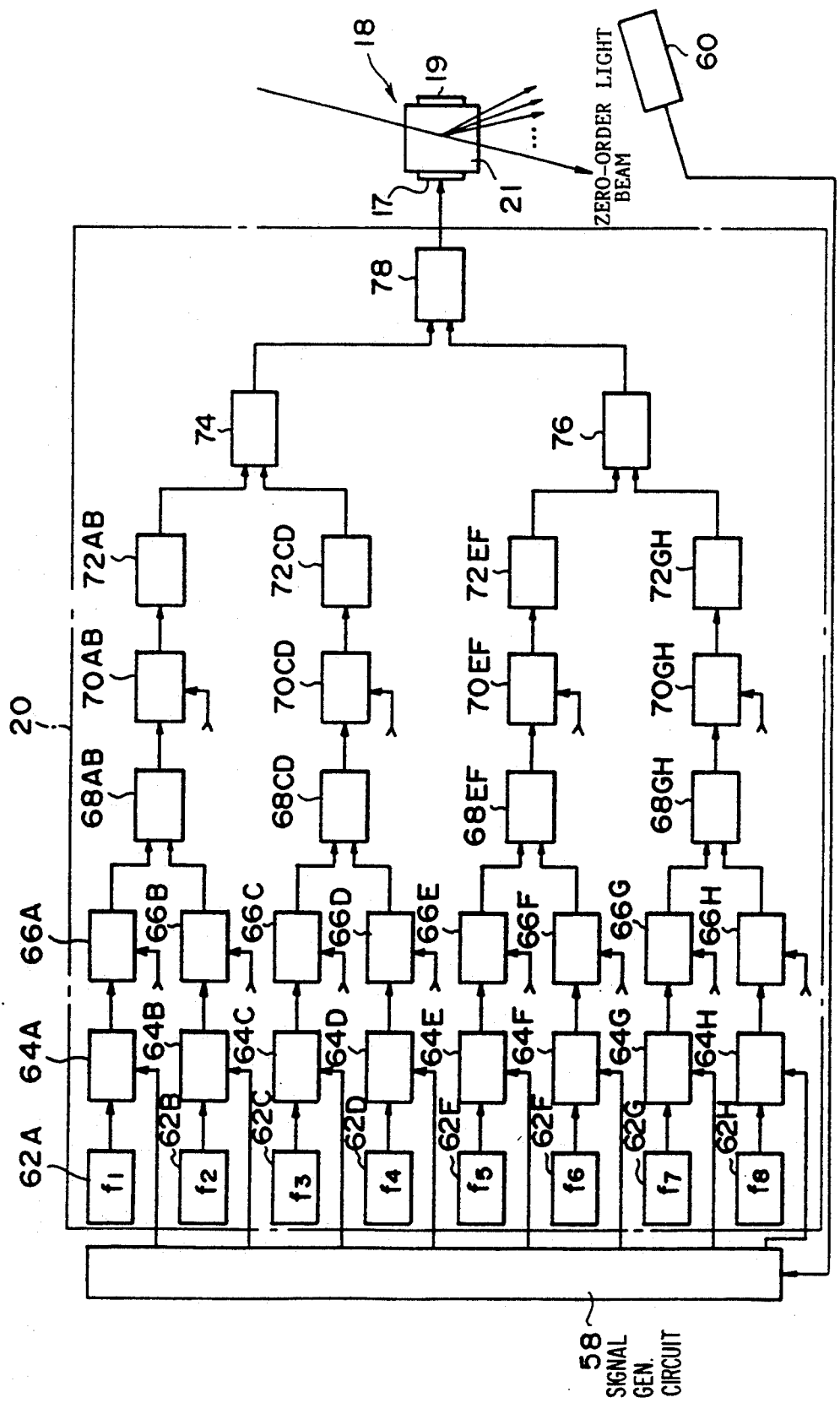
FIG. 13 is a block diagram illustrating an AOM driver according to the third embodiment of the present invention.
Figure 14:
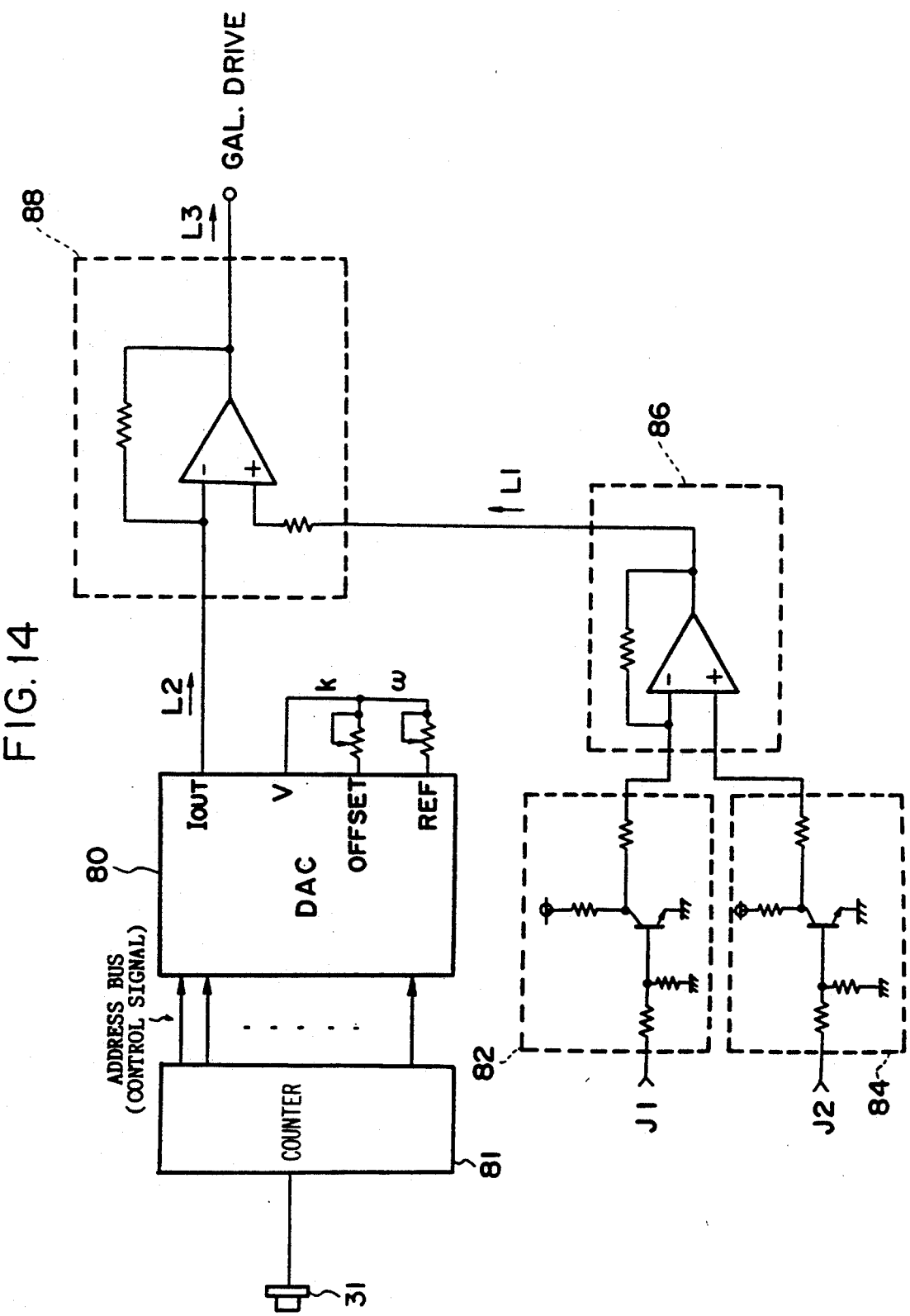
FIG. 14 is a circuit diagram illustrating the detail of a circuit for supplying a signal to a galvanometer mirror driver according to the third and a fourth embodiments of the present invention.

FIGS. 12 and 13 each illustrate a control circuit and an AOM driver according to this embodiment. This embodiment differs from the first and second embodiments only in that the modulating circuit is not used and, therefore, the same reference numerals are assigned to the portions corresponding to the first and second embodiments and the description thereof is omitted. The galvanometer mirror driver for controlling the angle of the galvanometer mirror is provided with a DAC (digital-analog converter) 80, inverter circuits 82, 84, differential circuits 86 and 88, as shown in FIG. 14. DAC 80 is connected to a counter 81 for forming the control signal according to a pulse signal from the photoelectric converter 31. DAC 80 is provided with an offset setting terminal OFFSET, to which a signal of level k is input, and a reference setting terminal REF, to which a signal of level w is input (where: k and w are each an integer of above 0). A loading jump signal J1 and a prejump signal J2 are respectively input into the inverter circuits 82 and 84, the outputs of which are input into the differential amplifier circuit 86. The output signal from the DAC 80 is input into one input terminal of the differential amplifier circuit 88 and the output from the amplifier circuit 86 is input into its other terminal. The output terminal of the differential amplifier circuit 88 is connected to the galvanometer mirror driver (not shown) to drive the galvanometer mirror. At least one of the offset setting terminal OFFSET and the reference setting terminal REF may be attached with a level setting circuit.

Figure 15A:
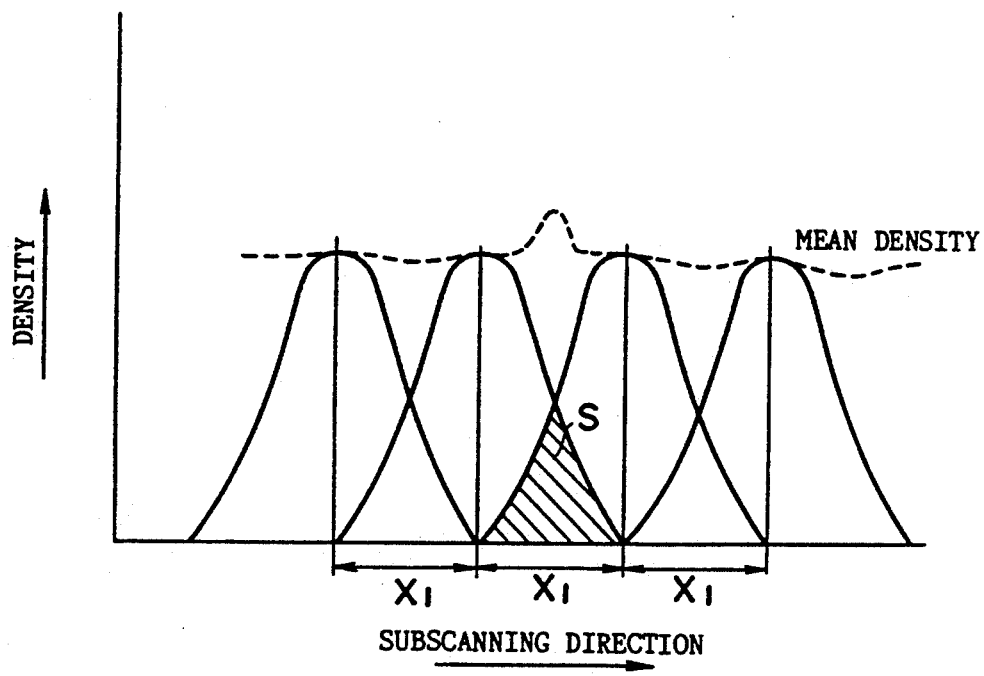
FIGS. 15A and 15B are both diagrammatic views illustrating the power of the laser beams on the photosensitive surface.
Figure 15B:
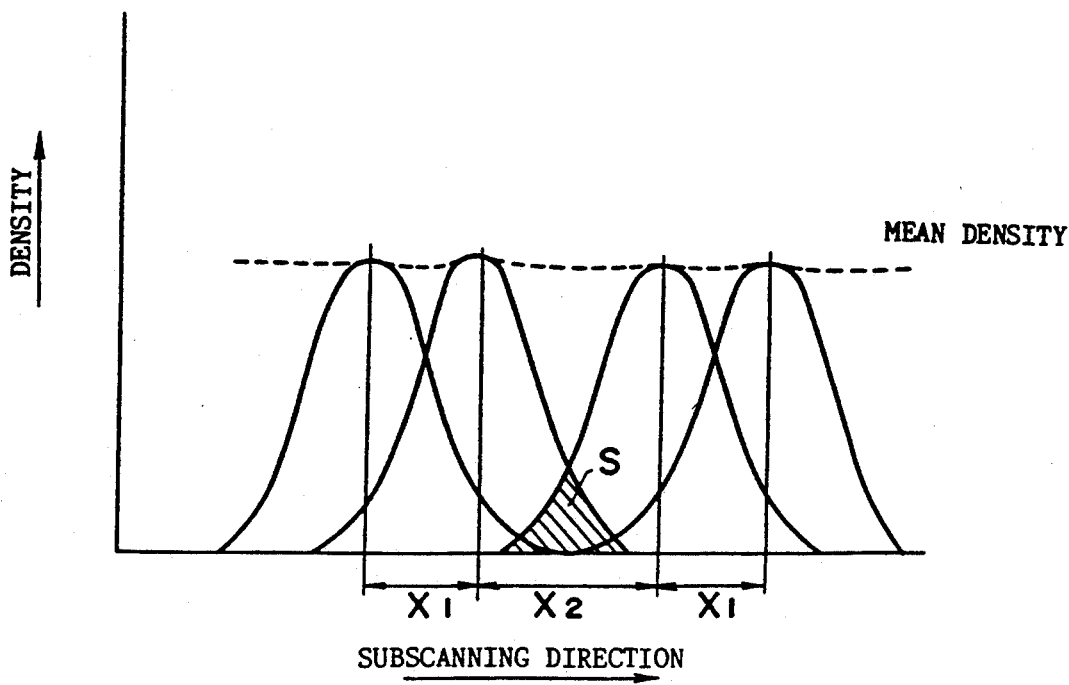

Next, the operation of this embodiment is described. In this embodiment, the control signal for controlling the rotating angle of the galvanometer mirror 36 is changed, that is, the sub-scanning speed is changed to change the distance between the first laser beam for the (N+1)th main scanning and the eighth laser beam for the Nth main scanning. Referring to FIGS. 14 and 16, a digital control signal formed by counting the pulse signals from the photoelectric converter 31 is entered into the DAC 80 and is converted into an analog signal L2 shown in FIG. 16D, by DAC 80. This control signal is formed by being incremented by one each time the number of pulses corresponding to the number of pixels for a single raster in a single main scanning is counted. In consequence, this analog signal L2 is a signal which increases linearly as the number of the main scannings for a single image frame which can be obtained from the pulse signal increases. At this time, since the signal is shifted in the positive direction by the level of k, which is input into the offset setting terminal OFFSET and its upper limit is set by the level w, which is input into the reference setting terminal REF, the output of the DAC 80 becomes as shown in FIG. 16D. By setting these level k and w to predetermined values, a gradient of a portion p, where the analog signal L2 shown in FIG. 16D, is linearly increased, can be set. When the loading jump signal J1 shown in FIG. 16A, and the prejump signal J2 shown in FIG. 16B are entered into the differential amplifier circuit 86 via the inverter circuits 82 and 84, a synthesized signal L1 shown in FIG. 16C, is output from the differential amplifier circuit 86. The synthesized signal L1 and the analog signal L2 are input into the differential amplifier circuit 88 and the control signal L3 is output from the differential amplifier circuit 88 for controlling the rotating angle of the galvanometer mirror 36. As a result, gradient p is changed for changing the sub-scanning speed and the distance between eighth laser beam for the Nth main scanning and the first laser beam for the (N+1)th main scanning can be accordingly changed. If this is explained in terms of the power of the laser beam on the photosensitive material, FIG. 15A, represents a portion where the laser beam is recorded on the photosensitive material when the photosensitive material is sub-scanned by a distance X1, in which the distance between each of the eight laser beams and the distance between the eighth laser beam for the Nth main scanning and the first laser beam for the (N+1) main scanning are equal. The s area of the oblique line portion represents an overlapping portion of the powers for the eighth laser beam for the Nth main scanning and the first laser beam for the (N+1) main scanning. This s area is a connecting portion for each plurality of laser beams, as described above, causing a high densification. As described above, if the high densification is caused at the connecting portion of each plurality of laser beams, then the high densification of the connecting portion can be avoided by making the above-described s area smaller. In this embodiment, by increasing the gradient of the portion p of the analog signal, the sub-scanning speed is increased. By increasing the sub-scanning speed, the distance between the eighth laser beam for the Nth main scanning and the first laser beam for the (N+1)th main scanning results in a distance X2 greater than the distance X1 and the s area becomes smaller.

As described above, since the distance between the eighth laser beam for the Nth main scanning and the first laser beam for the (N+1) laser beam is increased, an image which has the proper density can be formed at the overlapping portion of the laser beams.

Incidentally, in the foregoing, although the distance between the first laser beam for the (N+1)th scanning and the eighth laser beam for the Nth scanning is increased, if a low densification is caused at the overlapping portion, then this distance may be decreased.

Figure 17A:
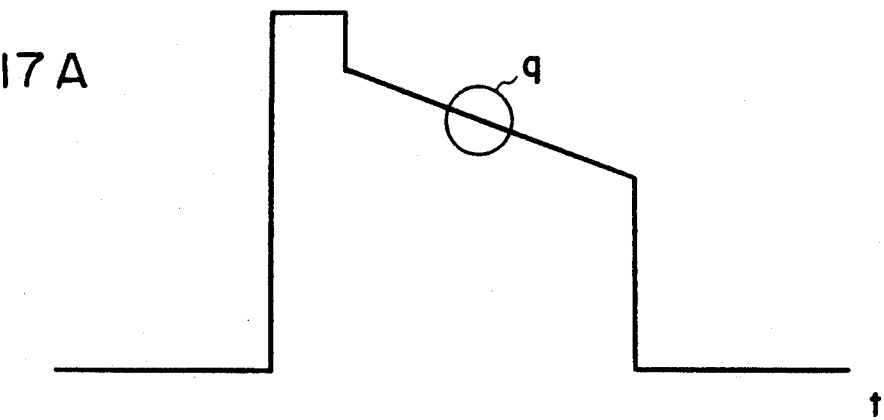
FIGS. 17A through 17C are both diagrammatic views illustrating a driving waveform of the galvanometer mirror driver according to the fourth embodiment.
Figure 17B:
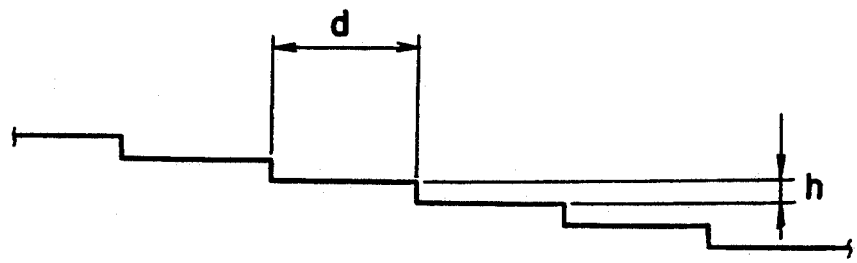
Figure 17C:
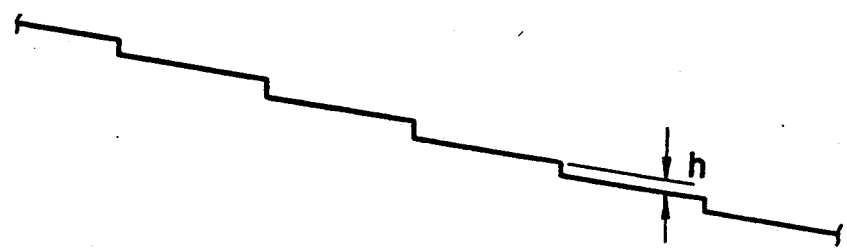

Next, a fourth embodiment is described. In the above-described third embodiment, since the rotating speed of the galvanometer mirror is increased and the sub-scanning is sped up, the right end of the resulting screen tends to be lowered. Therefore, in the fourth embodiment, the galvanometer mirror is driven with waveforms shown in FIG. 7, A-C. A waveform of a single screen for driving the galvanometer mirror is illustrated in FIG. 17, A. FIG. 17, B illustrates an enlarged q portion of FIG. 17, A and, in this embodiment, the driving of the galvanometer is changed stepwise instead of linearly, thus changing the driving of the galvanometer mirror, as in the third embodiment. d indicated in FIG. 1, B denotes the time corresponding to a single main scanning, and h a level corresponding to the distance taken in the sub-scanning direction between the eighth laser beam for the Nth main scanning and the first laser beam for the (N+1)th main scanning. Therefore, if the level h is increased, then the galvanometer is held at the same angle during the Nth main scanning and the main scanning is horizontally conducted. But when the main scanning for the Nth time is completed, the angle of the galvanometer is changed by the level of h. As a result, the distance between the eighth laser beam for the Nth main scanning and the first laser beam for the (N+1) main scanning taken in the feeding direction becomes greater than that between the adjacent laser beams for a single main scanning, the position of the eighth laser beam on the photosensitive surface is shifted, and the eighth laser beam for the Nth main scanning and the first laser beam for the (N+1)th main scanning overlap by a predefined amount smaller than the overlapping amount of the laser beams for a single main scanning to initiate the (N+1)th main scanning. As seen from above, by changing the level of h, the distances between the eight laser beams can be changed. In addition, by driving the galvanometer mirror with a waveform shown in FIG. 17, C, holding the gradient (shape of the image) taken in the horizontal direction of the main scanning caused by the conventional sub-scanning, only the distance between the first laser beam for the Nth main scanning and the first laser beam for the (N+1)th main scanning can be changed.

As described above, according to this embodiment, density unevenness, which can occur at the overlapping portion of the laser beams due to the reciprocity law, reciprocity and the multiple exposure, can be reduced. Also in this embodiment, the above-described level adjustment and the correction of the light intensity according to the number of the turned-on signals are performed. Incidentally, although, in the above-described embodiment, an acoustic optical element is used as the light modulator, a light waveguide type modulator may be used. In addition, although in the above-described embodiment a light beam scanning apparatus using eight laser beams was described, the number of the laser beams is not necessarily restricted to eight. Also, although in the foregoing a light beam scanning apparatus using the laser beam as the light beam was described, a scanning apparatus using the LED light as the light beam may also be used or the light beam may be created using other light sources.

What is claimed is:

1. A method of scanning for exposure using a plurality of optical beams, comprising steps of:

(a) performing a main scanning operation of m optical beams, which are arranged in an array so that part of adjacent optical beams overlap on a photosensitive surface, in a direction intersecting the line along which said optical beams are arranged, and performing a sub-scanning of said optical beams in the direction in which said optical beams are arrayed; and (b) correcting at least one of the mth one of the optical beams for the Nth main scanning and the first one of the optical beams for the (N+1)th main scanning.

2. A method of scanning for exposure as defined in claim 1 wherein, in said step (b), the power of at least one of said first and mth optical beams is changed.

3. A method of scanning for exposure as defined in claim 2 wherein, if the image density at the portion where the exposure by the Nth main scanning and the exposure by the (N+1)th main scanning overlap is high, then the power of at least one of said first optical beam and said mth optical beam is lowered.

4. A method of scanning for exposure as defined in claim 2 wherein, if the image density at the portion where the exposure by the Nth main scanning and the exposure by the (N+1)th main scanning overlap is low, then the power of at least one of said first and mth optical beams is increased.

5. A method of scanning for exposure as defined in claim 1 wherein, in said step (b), only during a period of time when the exposure of the mth one of the optical beams for the Nth main scanning and the exposure of the first one of said optical beams for th (N+1)th main scanning overlap, the power of at least one of said first and mth optical beams is changed.

6. A method of scanning for exposure as defined in claim 5 wherein, if the image density at the portion where the exposure of said first optical beam and the exposure of said mth light beam overlap is high, then the power of at least one of said first and mth optical beams is reduced.

7. A method of scanning for exposure as defined in claim 5 wherein, if the image density at the portion where the exposure of said first optical beam and the exposure of said mth optical beam overlap is low, then the power of at least one of said first and mth optical beams is increased.

8. A method of scanning for exposure as defined in claim 1 wherein, in said step (b), the distance between said first and mth optical beams is changed.

9. A method of scanning for exposure as defined in claim 8 wherein, if the image density at the portion where the exposure by the Nth main scanning and the exposure by the (N+1)th main scanning overlap is high, then the distance between said first and mth optical beams is increased.

10. A method of scanning for exposure as defined in claim 8 wherein, if the image density at the portion where the exposure by the Nth main scanning and the exposure by the (N+1)th main scanning overlap is low, then the distance between said first and mth optical beams is decreased.

11. A scanning and exposing apparatus which uses a plurality of optical beams, said apparatus comprising:
main scanning means for scanning m optical beams, which are arranged in an array so that part of adjacent optical beams overlap on a photosensitive surface, in a direction intersecting the line along which said optical beams are arranged;
sub-scanning means for scanning said m optical beams in the direction in which said optical beams are arrayed; and
correction means for correcting at least one of the mth one of the optical beams for the Nth main scanning and the first one of the optical beams for the (N+1)th main scanning.

12. A scanning and exposing apparatus as defined in claim 11 wherein, only during a period of time when the exposure of the mth one of the optical beams for the Nth main scanning and the exposure of the first one of the optical beams for the (N+1) main scanning overlap, at least one of said first and mth optical beams is corrected.

13. A scanning and exposing apparatus as defined in claim 11 wherein, said correction means includes a logic circuit for calculating a logical product of the image data recorded by said first optical beam and the image data recorded by said mth optical beam and a correction circuit for correcting the power of at least one of the first and mth optical beams based on an output from said logic circuit.

14. A scanning and exposing apparatus as defined in claim 13 wherein said correction circuit reduces the power of at least one of said first and mth optical beams if the image density at the portion where the exposure by the Nth main scanning and the exposure by the (N+1)th main scanning overlap is high.

15. A scanning and exposing apparatus as defined in claim 13 wherein said correction circuit increases the power of at least one of said first and mth optical beams if the image density at the portion where the exposure by the Nth main scanning and the exposure by the (N+1)th main scanning overlap is low.

16. A scanning and exposing apparatus as defined in claim 11 wherein said correction means includes a memory circuit for storing image data recorded by the mth one of the optical beams for the Nth main scanning, a logic circuit for calculating a logical product of image data recorded by the first one of the optical beams for the (N+1)th main scanning and image data stored within said memory circuit and outputting a first logic signal when both of the image data are present, and a second logic signal when at least one of the image data is not present, and a correction circuit for lowering the power of at least one of said first and mth optical beams when the first logic signal is output from said logic circuit, and for correcting the powers of said first and mth optical beams so that they may become substantially the same when the second logic signal is output from said logic circuit.

17. A scanning and exposing apparatus as defined in claim 11 wherein said correction means includes a memory circuit for storing the image data recorded by the mth one of the optical beams for the Nth main scanning and the image data recorded by the first one of the optical beams for the (N+1) main scanning, a logic circuit for calculating a logical product of the image data recorded by the mth optical beam stored within said memory circuit and outputting a first loge signal when both of the image data are present, and a second logic signal when at least one of the image data is not present, and a correction circuit for lowering the power of at least one of said first and mth optical beams when the first logic signal is output from said logic circuit and for correcting the powers of said first and mth optical beams so that they may become substantially the same when the second logic signal is output from said logic circuit.

18. A scanning and exposing apparatus using a plurality of optical beams said apparatus comprising:

main scanning means for scanning m optical beams, which are arrayed so that part of adjacent optical beams overlap on a photosensitive surface, in a direction intersecting the line along which said optical beams are arranged;

sub-scanning means for scanning said m optical beams in the direction in which said optical beams are arrayed;

turning on/off means for turning the optical beam on and off based on the image data so that the image is recorded in dots on the photosensitive surface;

memory means for storing the image data recorded by the mth one of the optical beams for the first main scanning of a single screen, and for outputting the image data recorded by the mth one of the optical beams for the Nth main scanning during the second and further scanning and storing the image data recorded by the first one of the optical beams for the (N+1)th main scanning;

logic means for calculating a logical product of the image data output from said memory means and the image data to be recorded and for outputting a first logic signal when both of the image data are present and a second logic signal when at least one of them is not present; and a correction means for lowering the power of at least one of said first and mth optical beams when the first logic signal is output from said logic circuit, and for lowering the powers of said first and mth optical beams so that they may become substantially the same when the second logic signal is output from said logic circuit.

19. A scanning and exposing apparatus as defined in claim 18 wherein said memory means is comprised of a line memory for outputting and storing image data in synchronicity with a clock signal output in response to the main scanning.

* * * * *